US006451084B1

(12) United States Patent
Petrey, Jr.

(10) Patent No.: US 6,451,084 B1
(45) Date of Patent: Sep. 17, 2002

(54) IRON OXIDE WASTE AGGLOMERATES AND METHOD OF ASSISTING A STEELMAKING OPERATION

(76) Inventor: Ernest Q. Petrey, Jr., 2338 Ardleigh Dr., Cleveland Heights, OH (US) 44106

( * ) Notice: Subject to any disclaimer, the term of this patent is extended or adjusted under 35 U.S.C. 154(b) by 0 days.

(21) Appl. No.: 09/825,799

(22) Filed: Apr. 4, 2001

Related U.S. Application Data

(60) Provisional application No. 60/195,081, filed on Apr. 6, 2000.

(51) Int. Cl.[7] ............................................... C22B 1/245
(52) U.S. Cl. ............................. 75/321; 75/484; 75/772; 75/500
(58) Field of Search ........................ 75/484, 321, 772, 75/500

(56) References Cited

U.S. PATENT DOCUMENTS

| | | | |
|---|---|---|---|
| 4,221,595 A | | 9/1980 | Zebrowski |
| 4,585,475 A | * | 4/1986 | Fosnacht ..................... 75/773 |
| 5,935,296 A | * | 8/1999 | Rees ........................... 77/770 |
| 6,013,116 A | | 1/2000 | Major et al. |
| 6,251,156 B1 | * | 6/2001 | Hoffman et al. ............... 75/484 |

OTHER PUBLICATIONS

Roman T. Dec, "Roll Press Agglomeration of Industrial Wastes for Treatment and Recycle", Second International Symposium on Extraction and Processing for the Treatment and Minimization of Wastes, The Minerals, Metals & Materials Society, 1996, pp. 1–10.

K.R. Komarek, "Selecting Binders and Lubricants for Agglomeration Processes", *Chemical Engineering*, Dec. 4, 1967, pp. 1–2.

Georgia Pacific Corp., *Georgia–Pacific: Chemicals: Products*, www.gp.com/chemical/lignosulfonate, Mar. 2000, pp. 1–6.

KBM Corporation, *Lignin Supplier*, Apr., 2000, p. 1.

* cited by examiner

*Primary Examiner*—Melvyn Andrews
(74) *Attorney, Agent, or Firm*—Pearne & Gordon LLP

(57) ABSTRACT

An iron oxide waste agglomerate, preferably a briquette, is provided including 0.03–15 weight percent on a dry basis lignosulfonate binder, 50–99.5 weight percent on a dry basis iron oxide waste, and 0.3–20 weight percent water. The agglomerate can further include 1–40 weight percent on a dry basis carbon source material such as carbon black, coke or coal. The briquette is heated in a furnace where the iron oxide waste is reduced to elemental iron. The binder is effective to prevent the briquettes from crumbling during the reducing opperation. The reduced iron briquette is then dropped into molten steel, thereby recycling iron oxide waste.

20 Claims, No Drawings

IRON OXIDE WASTE AGGLOMERATES AND METHOD OF ASSISTING A STEEL-MAKING OPERATION

This application claims the benefit of U.S. Provisional Patent Application Serial No. 60/195,081 filed on Apr. 6, 2000.

FIELD OF THE INVENTION

The present invention relates to recycling of iron oxide wastes and more particularly to iron oxide waste agglomerates with an improved binder.

BACKGROUND OF THE INVENTION

In the manufacture of steel, steel mills generate a number of types of iron oxide waste depending upon the process, equipment used, and the final product profile. Integrated steel mills generate up to 10% of their total production as iron oxide waste, while smaller plants (e.g. electric mini mills) generate roughly 4–7% of their total production as iron oxide waste. Typical iron oxide wastes include mill scale, flue dusts from blast, open-hearth, basic oxygen and electric arc furnaces, scarfer grit and swarf, metallic product removed from sludges, basic oxygen furnace dust, oily scale, or other iron oxide-containing revert materials. In addition, significant tonnage of carbon-based materials is also generated. For many years, people have tried to establish a method to recycle or reuse these materials.

One of the difficulties with recycling iron oxide waste materials is that while iron oxide can be readily reduced to elemental iron by the use of carbon, heat and a reducing atmosphere, the resultant reduced iron material needs to be of such density that when reintroduced into the steel making operation, it will sink into the molten metal and become incorporated therein; neither floating on the surface nor being carried off in the exhaust gas. One solution has been to try and pelletize the various raw iron oxide waste materials before introducing them into a reducing furnace. Several different types of materials have been used in the past as a binder, most notably molasses and molasses-lime combinations. However, molasses creates material handling problems, exhibits poor quality control and varies from batch to batch, thereby producing variances in the physical and cohesive properties of resulting agglomerates.

It is therefore desirable to provide a binder capable of effectively binding iron oxide waste materials into agglomerates such as briquettes or pellets for introduction into a reducing furnace, wherein the binder would be of more consistent quality from batch to batch, and would yield well cohered agglomerates that are less likely to flake or crumble when handled and reduced.

SUMMARY OF THE INVENTION

An iron oxide waste agglomerate is provided, comprising 0.03–15 weight percent on a dry basis lignosulfonate binder, 50–99.5 weight percent on a dry basis iron oxide waste, and 0.3–20 weight percent water. A method of assisting a steel-making operation is also provided, comprising the steps of providing lignosulfonate binder and iron oxide waste, mixing the lignosulfonate binder and the iron oxide waste and optionally adding water to form a mixture, and forming an iron oxide waste agglomerate from the mixture. The method can further comprise the steps of transferring the iron oxide waste agglomerate to a furnace, heating the agglomerate in the furnace and reducing iron oxide in the agglomerate to elemental iron and thereby providing a reduced iron agglomerate, and depositing the reduced iron agglomerate into molten steel.

DETAILED DESCRIPTION OF THE PREFERRED EMBODIMENTS OF THE INVENTION

Unless otherwise indicated or apparent, parts are parts by weight and percentages are weight percent. As used herein, when a preferred range such as 5–25 or 5 to 25 is given, this means preferably at least 5 and, separately and independently, preferably not more than 25.

The agglomerates described herein are preferably briquettes, less preferably pellets, less preferably agglomerates produced by industrial compacting, extruding or densifying techniques known in the art. Thus "agglomerates" includes briquettes, pellets, and other agglomerated items produced by industrial compacting, extruding or densifying techniques known in the art.

The invented iron oxide waste agglomerate, preferably a briquette, has the following preferred formulation or table of components. In this formulation or table of components, any preferred or less preferred weight percent or weight percent range of any component can be combined with any preferred or less preferred weight percent or weight percent range of any of the other components; it is not necessary that all or any of the weight percents or weight percent ranges come from the same column.

| | | Weight Percent | | |
|---|---|---|---|---|
| | Component | Preferred | Less Preferred | Less Preferred |
| 1. | Lignosulfonate Binder (dry basis) | 0.5–2 | 0.2–7<br>0.3–5<br>0.4–3 | 0.03–15<br>0.07–12<br>0.1–10 |
| 2. | Iron Oxide Waste (dry basis) | 80–90 | 70–95<br>72–92<br>75–91 | 50–99.5<br>55–99<br>60–98<br>63–97<br>65–96 |
| 3. | Carbon Source Material (dry basis) | 17–20 | 5–28.8<br>7–20<br>10–25<br>15–22 | 0–40<br>1–37<br>2–35<br>4–30 |
| 4. | Water | 2.5–4.52 | 2–6<br>2.5–5<br>3–4.7 | 0.3–20<br>0.5–15<br>1–10<br>1.5–8 |

The lignosulfonate binder comprises one or more lignosulfonic acids and their alkaline-earth metal, alkali metal and ammonium salts or esters, or other salts or metal salts or esters, more preferably the alkali metal salts and alkaline-earth metal salts, more preferably the magnesium, potassium and lithium salts, more preferably the calcium and ammonium salts, most preferably the sodium salts. Suitable lignosulfonate binders include those available from LignoTech USA of Rothschild, Wis., from KBM Corporation of Oconto Falls, Wis., from Georgia-Pacific Corporation of Bellingham, Wash., from Northway Lignin Chemical of Sturgeon Falls, Ontario, Canada, from TEMBEC of Brampton, Ontario, Canada (such as product No. S005), and from La Rochette Venizel of Saint Cloud, France, which lignosulfonate binders are known to those of ordinary skill in the art. The composition of these lignosulfonate binders is known in the art. The solids of the lignosulfonate binders are preferably at least 30, 40, 50, 60, 70, 80, 90, 95 or 99 weight percent lignosulfonate. The lignosulfonate binder weight percents provided in the chart above are on a dry basis. However, the lignosulfonate binder is generally provided commercially as a liquid material that comprises from 10 to 90, more preferably from 30 to 80, more preferably from 40–70, more preferably from 55 to 65, weight percent water. Thus, this water must be accounted for when calculating the weight percents provided above.

The composition of the iron oxide waste will vary depending upon the type of waste being reduced. Iron oxide waste is known in the steel-making art. Typical iron oxide waste includes mill scale, mixed scale, caster scale, oily mill scale, flue dusts from blast, open-hearth, basic oxygen or electric arc furnaces, scarfer grit and swarf, metallic product removed from sludges, basic oxygen furnace dust, oily scale, iron oxide-containing ground pellet fines, and other iron oxide-containing revert materials. Use of combination iron oxide waste material, referred to as mixed iron oxide waste, is preferred over a single type of iron oxide waste material in order to ensure a favorable particle size composition or distribution for the agglomerating or briquetting process, as well as to ensure proper chemical composition of the agglomerates. The iron oxide waste weight percents provided in the chart above are on a dry basis. However, the iron oxide waste may contain water. The amount of water will depend upon the type of iron oxide waste that is used in the agglomerates. Thus, this water must be accounted for when calculating the weight percents provided above.

The carbon source material is any carbon source known in the art, preferably carbon black, less preferably coke, coke breeze or petroleum coke, less preferably anthracite, lignite or bituminous coal or metallurgical coke, or mixtures thereof. Optionally, the agglomerates may be made without any carbon source material. The carbon source material weight percents provided in the chart above are on a dry basis. However, the carbon source material utilized may contain water. The amount of water will depend upon the particular carbon source material used in the agglomerates. Thus, this water must be accounted for when calculating the weight percents provided above.

The water comprises the water provided with the lignosulfonate binder, iron oxide waste and carbon source material. It also comprises any additional water that may be added, if needed, to provide an acceptable concentration or viscosity or dampness.

To form a briquette, the liquid binder is mixed with the combination iron oxide waste and carbon source material to form a briquette mixture. The briquette mixture is roll pressed to form briquettes. The briquettes are screened, with the fines being recycled back into the briquette mixture. The briquettes can gain additional cured strength if they are heated after being roll pressed, thus, the briquettes are conveyored or transferred to a rotary hearth or other type of industrial furnace known in the art, where the iron oxide is reduced to elemental iron in the reducing furnace, thus providing a reduced iron briquette or agglomerate. The hearth or furnace is operated at 2000–2500, more preferably 2100–2400, more preferably 2200–2300, more preferably about 2200, ° F. Less preferred to briquetting are other types of agglomerating including industrial compacting, pelletizing extruding or densifying as known in the art.

After the reduction operation, the resulting reduced iron briquettes are transferred back to the steel-making operation, where they are dropped or deposited into molten iron or steel. The molten metal is preferably contained in a hot metal car, torpedo car or ladle as known in the art. Less preferably, the reduced iron briquettes can be dropped into molten metal within a basic oxygen or electric arc furnace. During the transferring operation, the briquettes are preferably maintained at approximately the same temperature at which the rotary hearth is operated.

In an alternate, less prefered embodiment, the liquid binder material is dried prior to use in the process. The dry binder, the iron oxide waste and carbon source material are all mixed in a dry state. Water is then added to the mixture to form the briquetting or agglomerating mixture.

The quantity of lignosulfonate binder required will depend upon the density and specific surface area of the iron oxide waste particles to be reduced.

Iron oxide briquettes utilizing a lignosulfonate binder according to the invention exhibit excellent green strength, and are capable of withstanding reducing temperatures in excess of 2100° F. without significantly crumbling or flaking. "Green strength" refers to the strength of an iron oxide briquette immediately upon formation via roll pressing or other agglomerating techniques, and prior to heating in a reducing furnace. High green strength is important to minimize flaking or crumbling of briquettes in subsequent processing and handling.

Without wishing to be bound by any particular theory, it is believed that lignosulfonate binders yield iron oxide waste agglomerates with excellent strength qualities for one or more of the following reasons. Lignosulfonate binders achieve coalescence between insoluble materials by surface tension effects. It is further believed that lignosulfonates increase the plasticity of fine dusts by lubricating the boundaries of the particles. An aqueous lignosulfonate solution promotes bonding by van der Walls forces by increasing the true area of contact of the particles. When in solution, lignosulfonates are naturally tacky and exhibit excellent adhesive characteristics for the agglutination of solid particles. The inherent viscosity of high solids lignosulfonate systems generates a large cohesive force. Such cohesive force is enhanced by the ability of aqueous lignosulfonate solutions to modify wetability, dielectric constant and surface free energy. On evaporation of water from aqueous slurries, lignosulfonates improve interparticulate surface contact for a denser internal structure and smaller voids to give improved dry strength.

Further aspects of the invention will be illustrated in the following Examples.

EXAMPLE 1

A laboratory evaluation was undertaken in order to evaluate lignosulfonate binders. A number of different binders of different chemical types were tested along with molasses, three of which were found to be worthy of further study versus molasses:

1. Sodium Lignosulfonate
2. Ammonium Lignosulfonate
3. Sodium Polyacrylate

At the end of a second series of evaluations, the sodium lignosulfonate binder was selected for a plant trial.

In the plant trial, the sodium lignosulfonate binder was fed from a bulk tanker through a metering system that allowed the addition of different levels of water to the binder. A trial was conducted using a lignosulfonate binder that was about 40 weight percent dry sodium lignosulfonate and about 60 weight percent water. This product worked very well. One of the problems when using molasses is that the briquettes are formed successfully in the briquetting roll press, but when they are introduced into a reducing furnace for the reduction of the iron oxide to elemental iron, they lose their integrity and mostly crumble into dust. In this trial, the briquettes prepared using the sodium lignosulfonate binder retained their integrity in the reducing furnace and did not substantially crumble; i.e. they retained their shape.

EXAMPLE 2

In a test, iron oxide waste briquettes were prepared from ten different briquetting mixtures. The composition of each briquetting mixture is provided below in Table 1. Note that all percents in Table 1 are weight percents.

Table 1: Briquetting mixture compositions for mixed iron oxide waste briquettes

|  | Briquetting Mixture | | | | | | | | | |
| --- | --- | --- | --- | --- | --- | --- | --- | --- | --- | --- |
| Component | 1 | 2 | 3 | 4 | 5 | 6 | 7 | 8 | 9 | 10 |
| Blast Furnace Flue Dust | 24% | 24% | 24% | 24% | 21% | 21% | 9% | 9% | 9% | 9% |
| Ground Pellet Fines | 17% | 17% | 17% | 17% | 21% | 21% | 26% | 26% | 26% | 26% |
| BOF Dust | 16% | 16% | 16% | 16% | 16% | 16% | 18% | 18% | 18% | 18% |
| Mixed Scale | 13% | 13% | 0% | 0% | 19% | 0% | 21% | 0% | 21% | 0% |
| Caster Scale | 9% | 9% | 9% | 9% | 9% | 9% | 3% | 3% | 3% | 3% |
| Oily Scale | 7% | 7% | 7% | 7% | 10% | 10% | 5% | 5% | 5% | 5% |
| Steel Swarf | 0% | 0% | 13% | 13% | 0% | 19% | 0% | 21% | 0% | 21% |
| Coke Breeze | 10% | 0% | 10% | 0% | 0% | 0% | 13% | 13% | 0% | 0% |
| Carbon Black | 0% | 10% | 0% | 10% | 0% | 0% | 0% | 0% | 13% | 13% |
| Lignosulfonate Binder | 3% | 3% | 3% | 3% | 3% | 3% | 3% | 3% | 3% | 3% |
| Water | 1% | 1% | 1% | 1% | 1% | 1% | 2% | 2% | 2% | 2% |
| Total | 100% | 100% | 100% | 100% | 100% | 100% | 100% | 100% | 100% | 100% |

In some of the mixtures the lignosulfonate binder was sodium lignosulfonate (TEMBEC Product No. S001L); in the other mixtures it was calcium lignosulfonate (LignoTech USA Product No. Norlig A). In all ten briquetting mixtures listed in Table 1, the lignosulfonate binder was 50 wt. % solid or dry lignosulfonate, balance water. In addition, many of the iron oxide waste components listed in Table 1 contained latent water which also became part of the respective briquetting mixtures. The "water" component listed in Table 1 refers to additional substantially pure water that was added to each briquetting mixture in addition to that which was introduced by the binder, as well as latent water introduced by many of the iron oxide wastes. The above compositions were chosen because they represent commonly prevalent conditions at typical steel mills. Preferred weight percent ranges for selected iron oxide wastes and carbon source materials can be seen in the horizontal lanes in Table 1. Each of the compositions described in Table 1 produced mixed iron oxide briquettes of sufficient strength to remain substantially intact with no material crumbling or flaking at reducing temperatures, e.g. 2100–2300° F.

While the hereinabove described embodiments constitute the preferred embodiments of the invention, it will be understood that modifications and substitutions can be made without deviating from the scope of the invention as embodied in the appended claims.

What is claimed is:

1. An iron oxide waste agglomerate comprising 0.03–15 weight percent on a dry basis lignosulfonate binder, 50–99.5 weight percent on a dry basis iron oxide waste, and 0.3–20 weight percent water, wherein said waste agglomerate has sufficient green strength to remain substantially intact, with substantially no crumbling or flaking, at a reducing temperature of 2100° F.

2. An agglomerate according to claim 1, further comprising 1–40 weight percent on a dry basis carbon source material.

3. An agglomerate according to claim 1, wherein said lignosulfonate binder is selected from the group consisting of the alkaline-earth metal, alkali metal, and ammonium salts and esters of lignosulfonic acid, and mixtures of the foregoing.

4. An agglomerate according to claim 1, wherein said lignosulfonate binder is selected from the group consisting of the magnesium, potassium, lithium, calcium, ammonium and sodium salts of lignosulfonic acid, and mixtures of the foregoing.

5. An agglomerate according to claim 1, wherein said lignosulfonate binder is sodium lignosulfonate.

6. An agglomerate according to claim 1, wherein said iron oxide waste agglomerate is a briquette.

7. An agglomerate according to claim 1, wherein said iron oxide waste includes one or more of blast furnace flue dust, basic oxygen furnace dust, open-hearth or electric arc furnace flue dust, oily scale, steel swarf, scarfer grit, mill scale and caster scale.

8. An agglomerate according to claim 2, wherein said carbon source material is selected from the group consisting of carbon black, coke, coke breeze, coal, and mixtures thereof.

9. An agglomerate according to claim 1, wherein said agglomerate is 1.5–8 weight percent water.

10. An agglomerate according to claim 1, wherein said iron oxide waste is mixed iron oxide waste.

11. A method of assisting a steel-making operation comprising the steps of:
providing lignosulfonate binder and iron oxide waste,
mixing said lignosulfonate binder and said iron oxide waste to form a mixture, and
forming an iron oxide waste agglomerate from said mixture, said waste agglomerate having sufficient green strength to remain substantially intact, with substantially no crumbling or flaking, at a reducing temperature of 2100° F.

12. A method according to claim 11, wherein said iron oxide waste agglomerate comprises 0.03–15 weight percent on a dry basis lignosulfonate binder, 50–99.5 weight percent on a dry basis iron oxide waste, and 0.3–20 weight percent water.

13. A method according to claim 11, further comprising the step of mixing carbon source material into said mixture.

14. A method according to claim 12, said iron oxide waste agglomerate further comprising 1–40 weight percent on a dry basis carbon source material.

15. A method according to claim 11, wherein said agglomerate is a briquette.

16. A method according to claim 11, wherein said iron oxide waste is mixed iron oxide waste.

17. A method according to claim 11, further comprising the steps of:

transferring said iron oxide waste agglomerate to a furnace, heating said agglomerate in said furnace and reducing iron oxide in said agglomerate to elemental iron and thereby providing a reduced iron agglomerate, and depositing said reduced iron agglomerate into molten steel.

18. A method according to claim 17, wherein said furnace is heated at 2000–2500° F.

19. A method according to claim 17, wherein said iron oxide waste agglomerate is a briquette.

20. A method according to claim 17, wherein said furnace is a rotary hearth.

\* \* \* \* \*